(12) United States Patent
Okuno et al.

(10) Patent No.: US 11,212,428 B2
(45) Date of Patent: Dec. 28, 2021

(54) IMAGE-CAPTURING APPARATUS

(71) Applicant: CANON KABUSHIKI KAISHA, Tokyo (JP)

(72) Inventors: Ryoji Okuno, Kanagawa (JP); Hidetoshi Kei, Tokyo (JP); Shingo Iwatani, Chiba (JP); Keita Iwai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/127,745

(22) Filed: Dec. 18, 2020

(65) Prior Publication Data

US 2021/0195078 A1   Jun. 24, 2021

(30) Foreign Application Priority Data

Dec. 23, 2019 (JP) .............................. JP2019-231168

(51) Int. Cl.
*H04N 5/225* (2006.01)
*G03B 17/02* (2021.01)

(52) U.S. Cl.
CPC ....... *H04N 5/225251* (2018.08); *G03B 17/02* (2013.01)

(58) Field of Classification Search
CPC .......................... H04N 5/225251; G03B 17/02
USPC .................................................. 348/333.06
See application file for complete search history.

(56) References Cited

U.S. PATENT DOCUMENTS 10,091,427 B2 * 10/2018 Sato ................. H04N 5/232941
2015/0029380 A1 * 1/2015 Noh ........................ G03B 13/06
348/333.01

FOREIGN PATENT DOCUMENTS

JP         2017-021303 A      1/2017

* cited by examiner

*Primary Examiner* — Lin Ye
*Assistant Examiner* — Chan T Nguyen
(74) *Attorney, Agent, or Firm* — Canon U.S.A., Inc., IP Division

(57) ABSTRACT

An image-capturing apparatus includes a main body and a finder unit configured to transition between a retracted state and a projected state. The finder unit includes a non-rotatable portion provided with a rotation shaft, a rotatable portion that is rotatable around the rotation shaft and has an eyepiece, and a restricting member that restricts a transition from a pulled-out state to the retracted state, the eyepiece has an engaging portion and the restricting member has an engaged portion having a convex shape, the engaging portion and the engaged portion being engaged with each other in a transition between the projected state and the retracted state, and an engagement between the engaging portion and the engaged portion is released when the rotatable portion is rotated in the pulled-out state.

14 Claims, 9 Drawing Sheets

IMAGE-CAPTURING APPARATUS

BACKGROUND OF THE INVENTION

Field of the Invention

The present disclosure relates to an image-capturing apparatus including an electronic viewfinder.

Description of the Related Art

Conventionally, in a camera including an electronic viewfinder (hereinafter, simply referred to as a finder), a finder eyepiece can be translated in a direction of an optical axis of the finder. When the finder is in use, the finder eyepiece is pulled out in the direction of the optical axis of the finder. When the finder is not in use, the finder eyepiece is retracted and a compact camera configuration can be realized.

Further, it is known that the finder can be rotated with respect to a camera body to increase a degree of freedom of a photographer's shooting posture.

Japanese Patent Laid-open No. 2017-021303 discloses an image-capturing apparatus including a finder which is rotatable by a rotation mechanism.

In a configuration described in Japanese Patent Laid-open No. 2017-021303, the finder is always in a state of projecting from an outer shape of the camera.

For this reason, that hinders a shooting operation and hinders portability when the camera is not used. Therefore, the portability can be improved by not projecting the finder from the camera body when not in use and projecting the finder from the camera body when in use.

Further, in a projected state where the finder is projected from the camera body when in use, by pulling out the finder eyepiece and allowing the finder to rotate with respect to the camera body, a degree of freedom of a photographer's shooting posture can be increased.

In such a configuration, there are state transitions such as a state transition between retraction and projection of the finder to the camera body, a state transition between used position and non-used position by pulling out the finder eyepiece, and a state transition between rotation and non-rotation of the finder.

For example, if in a state where the finder eyepiece is pulled out when the finder is in use, the finder transitions from the projected state to the retracted state with respect to the camera body, there is a risk that the finder eyepiece will be damaged. In addition, if in a state where the finder is rotated by a predetermined angle in the projected state with respect to the camera body, when the finder is in use, a user inadvertently makes the finder transition from the projected state to the retracted state, there is a risk of impairing convenience when the finder is in use.

SUMMARY OF THE INVENTION

The present disclosure provides an image-capturing apparatus including a compact finder that is not projected from a camera body when not in use, is rotatable in a state where it is projected from the camera body when in use, and can prevent a decrease in convenience and a damage to the camera due to inadvertent transition to unintended states.

An image-capturing apparatus as one aspect of the present disclosure includes a main body and a finder unit configured to transition between a retracted state in which the finder unit is retracted inside the main body and a projected state in which the finder unit is projected outside the main body, wherein the finder unit includes a non-rotatable portion provided with a rotation shaft, a rotatable portion that is rotatable around the rotation shaft and has an eyepiece, and a restricting member that restricts a transition from a pulled-out state in which the eyepiece is pulled out from the finder unit in the projected state to the retracted state, the eyepiece has an engaging portion and the restricting member has an engaged portion having a convex shape, the engaging portion and the engaged portion being engaged with each other in a transition between the projected state and the retracted state, and an engagement between the engaging portion and the engaged portion is released when the rotatable portion is rotated in the pulled-out state.

Further features of the present disclosure will become apparent from the following description of exemplary embodiments with reference to the attached drawings.

DESCRIPTION OF THE EMBODIMENTS

Figure 1A:
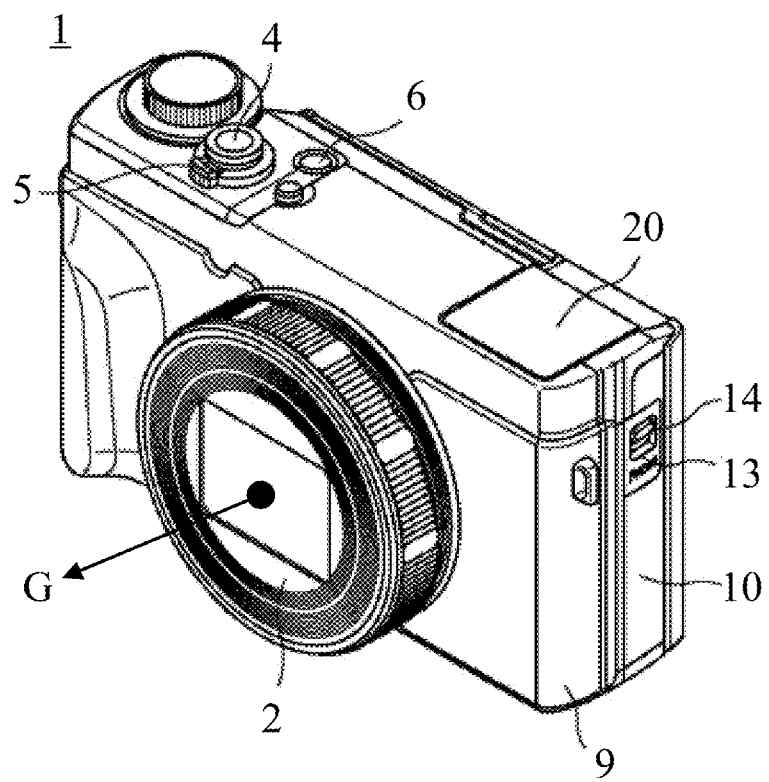
FIGS. 1A and 1B are perspective views of an image-capturing apparatus according to an embodiment of the present disclosure.

Referring now to the accompanying drawings, a description will be given of an embodiment according to the present disclosure. Corresponding elements in respective figures will be designated by the same reference numerals, and a description thereof will be omitted.

Figure 1B:
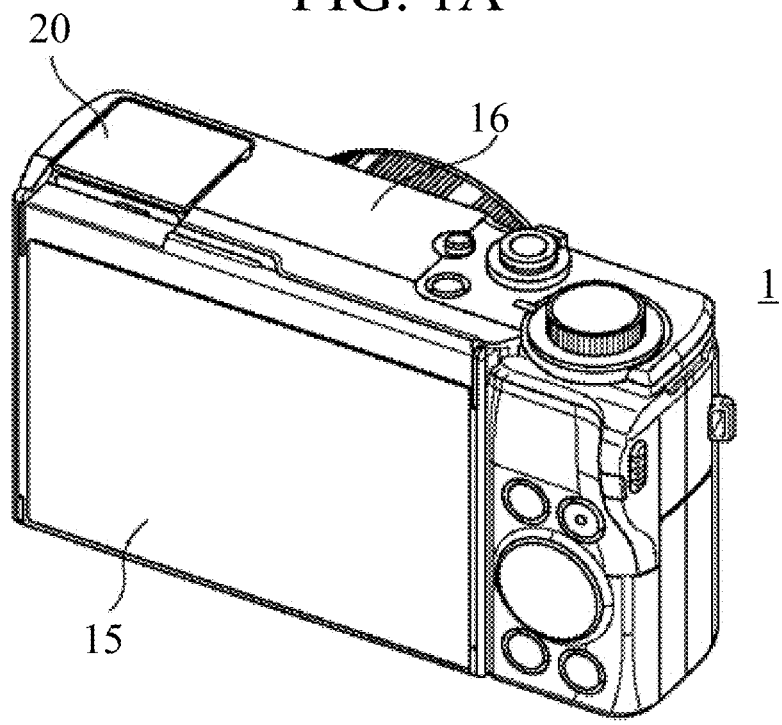

A configuration of an image-capturing apparatus 1 which is an example of the image-capturing apparatus according to an embodiment of the present disclosure will be described with reference to FIGS. 1A and 1B. In the following description, an EVF refers to an electronic viewfinder. FIGS. 1A and 1B are perspective views of the image-capturing apparatus 1 according to the embodiment of the present disclosure. FIGS. 1A and 1B are a front perspective view and a rear perspective view of the image-capturing apparatus 1, respectively.

The image-capturing apparatus (main body) 1 includes a lens barrel unit 2 including an image-capturing optical system (not shown). An arrow G indicates an optical axis direction of an image-capturing lens of the image-capturing apparatus 1. The image-capturing apparatus 1 includes an image sensor (not shown) that generates image data by photoelectrically converting an optical image of an object imaged through a plurality of image-capturing lenses constituting the image-capturing optical system. The lens barrel unit 2 is a retractable type, and when retracted, it is retracted inside the image-capturing apparatus 1. The image-capturing apparatus 1 is composed of a main substrate (not shown) on which a processing circuit for converting the image data generated by the image sensor into digital information is mounted, an auxiliary substrate (not shown), and the like. When a release button 4 is fully pressed, image-capturing is performed and the image data of the object image is recorded on a recording medium (not shown). A zoom lever 5 is rotatably held on an outer circumference of the release button 4. When the zoom lever 5 is rotated, a zoom operation is performed. By pressing a power button 6, an ON state (use state) and an OFF state (non-use state) can be switched. A display device 15 is provided on a back surface of the image-capturing apparatus 1 and is used for confirming an object image to be captured and for reproducing and displaying a captured image.

The image-capturing apparatus 1 is covered with exterior members of a front cover 9, a rear cover 10, and a top cover 16. The top cover 16 forms an upper part of an appearance surface of the image-capturing apparatus 1 and also forms an opening for a finder 20. The finder 20 is built in the image-capturing apparatus 1, and when retracted, the finder 20 is locked while being held inside the image-capturing apparatus 1 by a lock mechanism. A side cover 13 forming a part of the appearance surface is formed on a side surface of the image-capturing apparatus 1. A release lever 14 is held on the side cover 13 so as to be slidable. By operating the release lever 14, the finder 20 is unlocked, and the finder 20 is projected upward of the image-capturing apparatus 1.

Figure 2A:
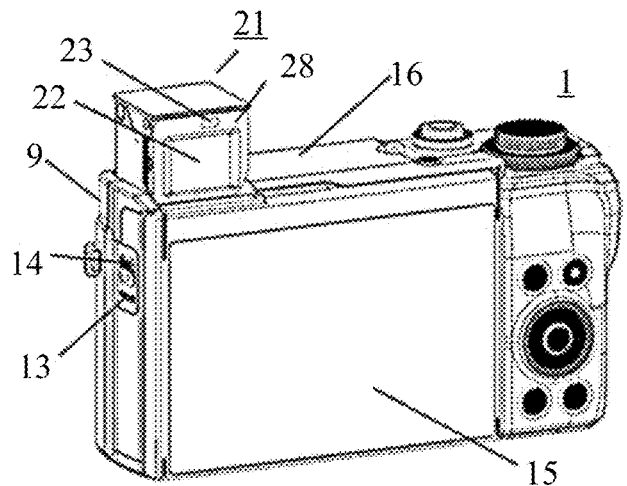
FIGS. 2A to 2C are perspective views of the image-capturing apparatus with a finder projected.
Figure 2B:
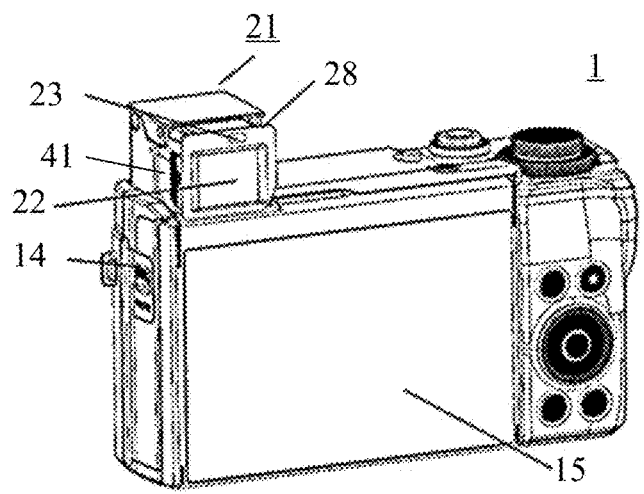
Figure 2C:
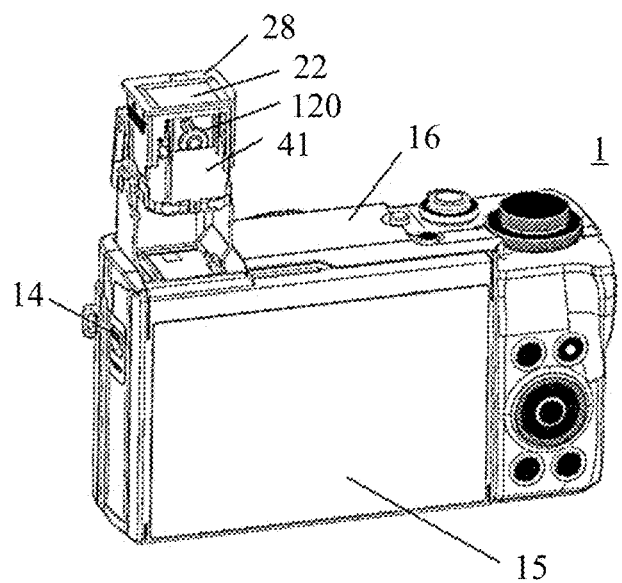

Next, an operation of the finder 20 of the present disclosure illustrated in FIGS. 1A and 1B will be described with reference to FIGS. 2A to 2C. FIGS. 2A to 2C are rear perspective views of the image-capturing apparatus 1 with the finder 20 projected.

FIG. 2A illustrates a state (projected state) in which the finder unit 21 is projected upward from a retracted state in which the finder unit 21 is retracted in the image-capturing apparatus 1 by operating the release lever 14 arranged on the side surface of the image-capturing apparatus 1. That is, the finder unit 21 is configured to transition between the retracted state and the projected state. An eyepiece window 22 is fixed to an eyepiece 28. A sensor window 23 is provided above the eyepiece window 22. The sensor window 23 is provided for an optical path of an internal sensor, such as an optical detection sensor. The internal sensor detects that the user of the image-capturing apparatus 1 has looked into the eyepiece 28, and a display is switched from the display device 15 to the finder unit 21.

FIG. 2B illustrates a state in which the eyepiece 28 of the finder unit 21 is pulled out from the projected state of the finder unit 21 illustrated in FIG. 2A to a back side of the image-capturing apparatus 1 (a state in which the eyepiece 28 has been completely pulled out to the back side of the image-capturing apparatus 1). The finder 20 can be used in the state where the eyepiece 28 is pulled out, and the eyepiece 28 can be used for confirming the object image and for confirming a reproduction display of the captured image.

Further, FIG. 2C illustrates a state in which a finder rotating portion (rotatable portion) 41 including the eyepiece 28 is rotated in the state where the finder 20 can be used illustrated in FIG. 2B. The finder rotating portion 41 can be rotated about 90 degrees until the eyepiece 28 comes to a position parallel to the top cover 16. In other words, the eyepiece window 22 is rotated until it faces a top surface with respect to the image-capturing apparatus 1. By providing the sensor window 23 above the eyepiece window 22, the internal sensor (not shown) can detect that the user has looked into the eyepiece 28 within a range in which the finder rotating portion 41 is rotated. Therefore, the user can also confirm the object image to be captured and the reproduction display of the captured image from an upper surface side of the camera. A diopter adjustment lever 120 is arranged below the eyepiece 28 when viewed from a side of the eyepiece window 22 in a posture of the image-capturing apparatus 1 illustrated in FIG. 2C. Therefore, the diopter adjustment lever 120 is exposed in a state where the eyepiece 28 of the finder unit 21 is pulled out and the finder rotating portion 41 is rotated by about 90 degrees. The user can adjust a diopter of the finder 20 by rotating the diopter adjustment lever 120.

Figure 3A:
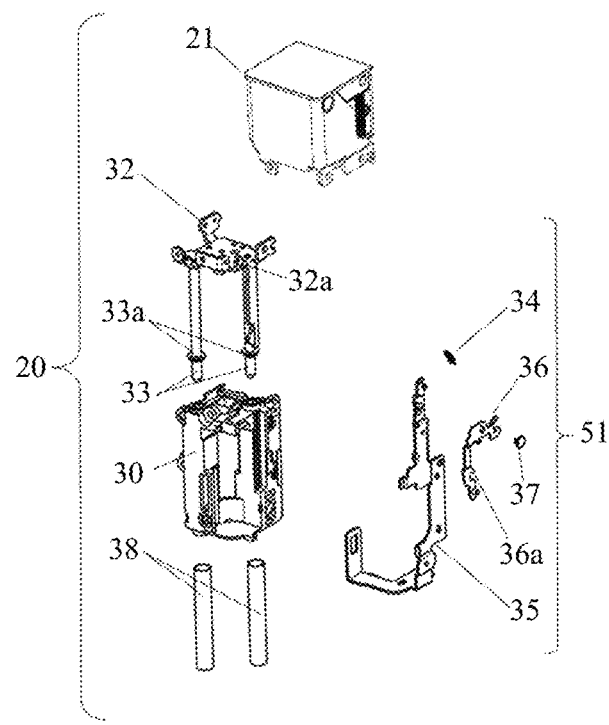
FIGS. 3A to 3C are expanded perspective views illustrating a configuration of the finder.
Figure 3B:
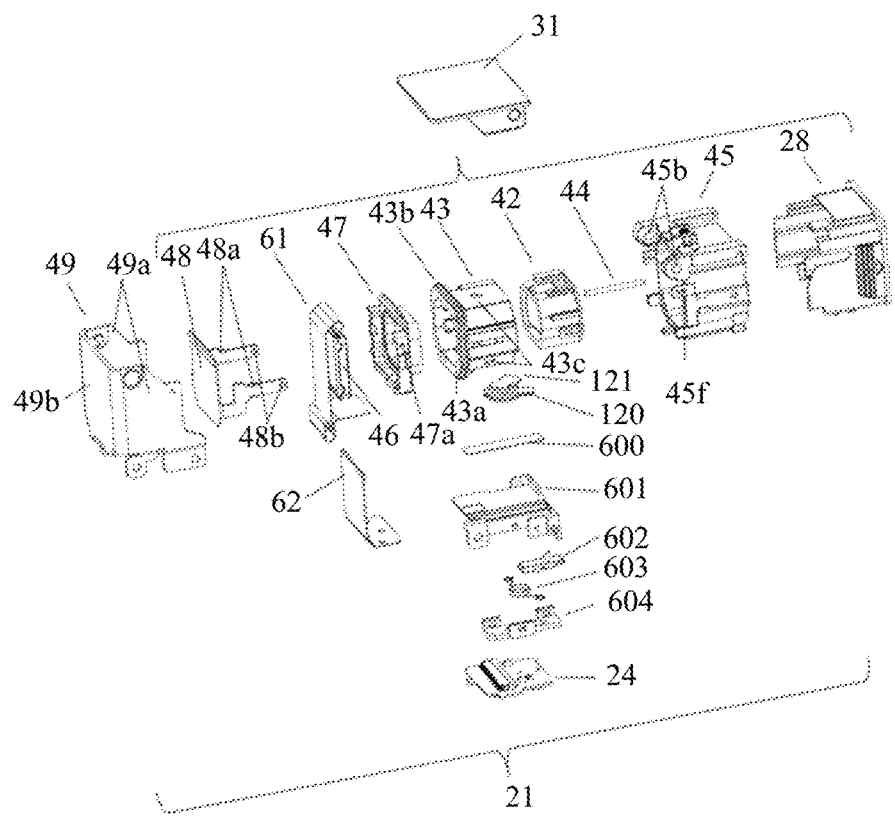
Figure 3C:
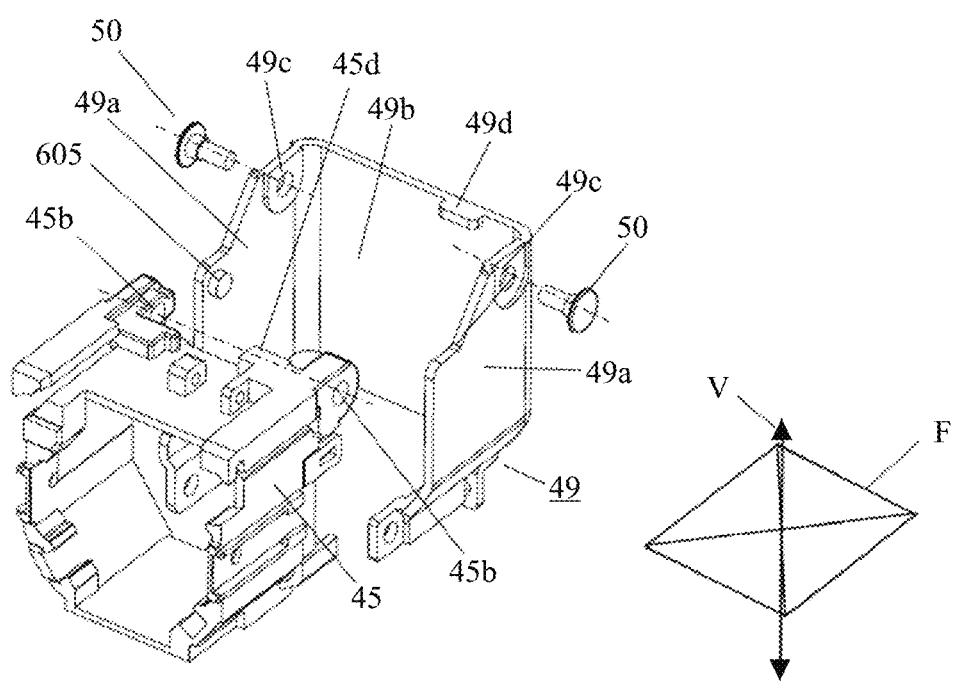

Next, a configuration of the finder 20 will be described with reference to FIGS. 3A to 3C. FIGS. 3A to 3C are expanded perspective views of the configuration of the finder 20. As illustrated in FIG. 3A, the finder 20 includes the finder unit 21 and a pop-up mechanism portion 51 that moves up and down and switches a state between the retracted state and the projected state. FIG. 3A is an expanded perspective view illustrating the pop-up mechanism portion 51, constituting the finder 20, that moves up and down.

A base plate 32 is made of a metal plate, and two guide bars 33 made of a metal material are crimped. A locking pin 32a is formed on the base plate 32. A flange-shaped portion 33a is formed on the guide bar 33 so as to be partially enlarged in a radial direction. An EVF holder 30 is made of a resin material. The two guide bars 33 crimped to the base plate 32 are inserted into the EVF holder 30, and the EVF holder 30 holds the guide bars 33 so as to be slidable up and down. The flange-shaped portion 33a of the guide bar 33 comes into contact with the EVF holder 30, so that a slide position at the time of projection is determined. The EVF holder 30 is positioned and fixed to the front cover 9 illustrated in FIGS. 1A and 1B. A projection spring 38 is housed inside the EVF holder 30 and urges the guide bars 33 upward.

A spring holder 35 is made of a sheet metal material and is fixed to the EVF holder 30 so as to hold an end of the projection spring 38. A lock lever 36 is rotatably held with respect to the spring holder 35 by a crimping pin 37, and includes a locking claw portion 36a. An urging spring 34 is held with one end of the urging spring 34 locked to the lock lever 36 and the other end locked to the spring holder 35, and the urging spring 34 is configured in a state of urging the lock lever 36 in one direction. The lock lever 36 is configured to rotate around the crimping pin 37 by operating the release lever 14 illustrated in FIGS. 1A and 1B. When the finder 20 is retracted, the locking pin 32a of the base plate 32 is locked by the locking claw portion 36a of the lock lever 36. As a result, the finder 20 is held in the retracted state. When the finder 20 is used, the lock lever 36 is rotated by the operation of the release lever 14 to release the lock of the locking pin 32a. As a result, the finder 20 is projected.

Next, a configuration of the finder unit 21 will be described. FIG. 3B is an expanded perspective view of the finder unit 21. The finder unit 21 has the finder rotating portion 41 and a finder cover (non-rotatable portion) 49 that covers the finder rotating portion 41. The finder unit 21 is provided with a finder top cover 31 that forms the appearance surface of the upper surface together with the top cover 16. Further, the finder cover 49 has two side surfaces 49a that are parallel to a movable direction in the projected state. The side surfaces 49a of the finder cover 49 consist of a first surface located on a left side of an optical axis of a finder lens and a second surface located on the right side of the optical axis of the finder lens.

The finder rotating portion 41 constituting the finder unit 21 has a lens holder 42 that holds the finder lens, a finder guide barrel 43 that holds the lens holder 42 so as to be translatable in the optical axis direction of the finder lens, and a flange portion 43a of the finder guide barrel 43. A guide shaft 44 that linearly movably guides the finder guide barrel 43 penetrates through the flange portion 43a. One end of the guide shaft 44 is fixed to a finder fixed barrel 45.

The eyepiece 28 is locked to the finder guide barrel 43 by locking claws 43c provided on side surfaces of the finder guide barrel 43. By pulling out the eyepiece 28, the finder guide barrel 43 pivotally supported by the guide shaft 44 moves in translation with the internal lens holder 42 to be ready for use. A seal member 43b is provided on an outer periphery of the flange portion 43a of the finder guide barrel 43. The seal member 43b seals a space between the finder fixed barrel 45 and the finder guide barrel 43 to form a dustproof structure. A display unit holder 47 holds a display unit 46. A locking claw 47a is provided on a side surface of the display unit holder 47, and is integrated with a locking portion 45f on a side of the finder fixed barrel 45.

Arm portions 48a of a display panel forcing plate 48 are fixed to the finder fixed barrel 45, and the display panel forcing plate 48 urges the display unit 46 toward the display unit holder 47. A tip 48b of the arm portion 48a also serves as a click portion with respect to the finder guide barrel 43 that operates integrally when the eyepiece 28 is pulled out. The display panel forcing plate 48 rotates together with the finder rotating portion 41.

A base 601 is provided between a lower part of the finder unit 21 and an upper part of the pop-up mechanism portion 51. Both the base 601 and the finder cover 49 are fixed to the base plate 32 by a plurality of fastening screws. A finder substrate 24 is fixed to the base 601. A flexible substrate (not shown) for transmitting an image signal from a main substrate inside the image-capturing apparatus 1 is connected to the finder substrate 24, and the signal is further transmitted by a flexible substrate 61 connected to the display unit 46. A flexible substrate cover 62 is fixed to the base 601. The flexible substrate 61 is arranged in a gap between a connecting surface 49b of the finder cover 49 and the flexible substrate cover 62.

On an upper surface of the base 601, there is a decorative plate 600 that closes an upper surface opening of the base 601. On a lower surface of the base 601, there is a restricting member 602 for maintaining a state where the base 601 is projected. A toggle spring, which is an urging member 603, urges the restricting member 602 between the base 601 and the restricting member 602 with both ends of the spring supported. A support member 604 is engaged with the base 601 from the lower surface of the base 601 in order to support the restricting member 602 and the urging member 603 on the base 601.

A cam shape portion 121 is integrated with the diopter adjustment lever 120. The cam shape portion 121 integrated with the diopter adjustment lever 120 is slidably fitted to the finder guide barrel 43. When the diopter adjustment lever 120 is rotated, the lens holder 42 is translated inside the finder guide barrel 43 by the cam shape portion 121. Therefore, by rotating the diopter adjustment lever 120, the user can adjust the diopter of the finder 20.

Next, a finder rotation operation will be described with reference to FIG. 3C. FIG. 3C is a diagram illustrating a relationship between the finder cover 49 and the finder fixed barrel 45. The finder cover 49 includes the first surface and the second surface 49a that are parallel to the optical axis direction of the finder lens and parallel to the movable direction of the finder unit 21. A finder unit rotation shaft 50 is held by holes 49c provided on the first surface and the second surface 49a. The finder unit rotation shaft 50 is divided into two members which are a first shaft penetrating the first surface and a second shaft penetrating the second surface. The finder unit rotation shaft 50 is divided into two members, but a single member for the finder unit rotation shaft 50 may be used.

The first surface and the second surface 49a are connected by a third surface 49b located closer to an object side than the first surface and the second surface 49a, and the first surface, the second surface 49a, and the third surface 49b are U-shaped in a cross section F orthogonal to the movable direction V between the retracted state and the projected state. The finder unit rotation shaft 50 is rotatably fitted into shaft holes 45b provided in the finder fixed barrel 45 constituting the finder rotating portion 41, and is held by the first surface and the second surface 49a of the finder cover 49. The finder unit rotation shaft 50 can secure strength as a rotation shaft by being coupled to the finder cover 49 having rigidity. The finder unit rotation shaft 50 is provided on an opposite side to the eyepiece 28 in the optical axis direction of the finder lens with respect to the lens holder 42, and on a side where the finder unit 21 is projected with respect to the optical axis of the finder lens. Therefore, the finder fixed barrel 45 is rotatable with respect to the finder cover 49.

The finder cover 49 is provided with a rotation stopper portion 49d. The finder fixed barrel 45 has a configuration in which a contact portion 45d comes into contact with the rotation stopper portion 49d when rotated by about 90 degrees. The finder rotating portion 41 can rotate between 0 degrees, in which the optical axis of the finder lens is substantially parallel to the optical axis of the image-capturing optical system, and 90 degrees.

A convex portion 605 projecting in an inner surface direction of the finder cover 49 is provided on an inner surface of either the first or second surface 49a of the finder cover 49. The convex portion 605 is engaged with a straight groove 606a of the eyepiece 28 described later.

Figure 4A:
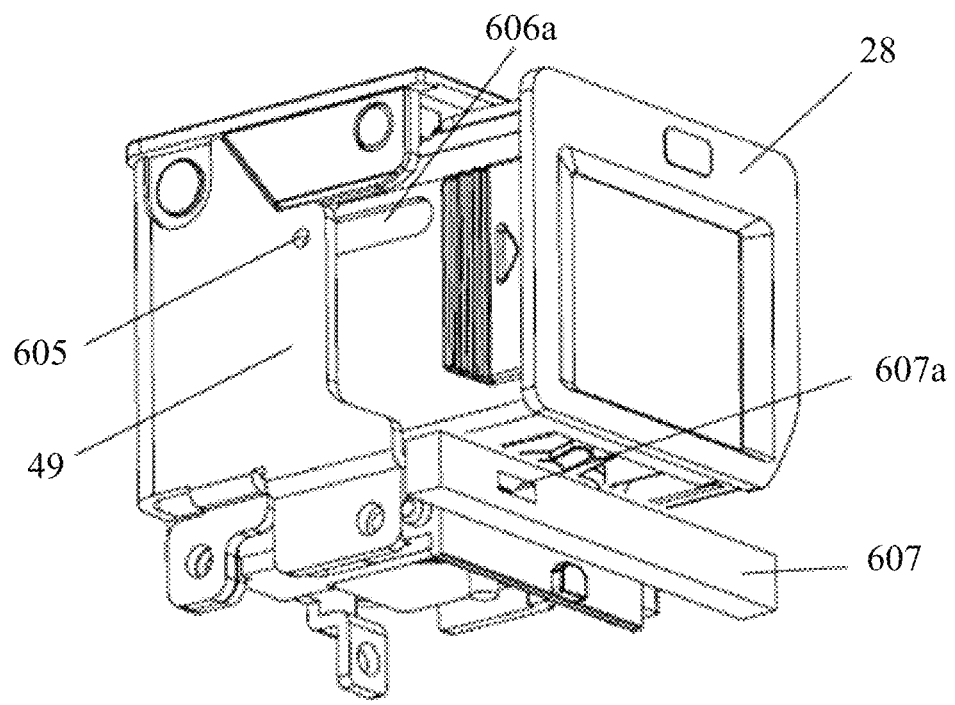
FIGS. 4A to 4D are perspective views illustrating components of a finder unit.
Figure 4B:
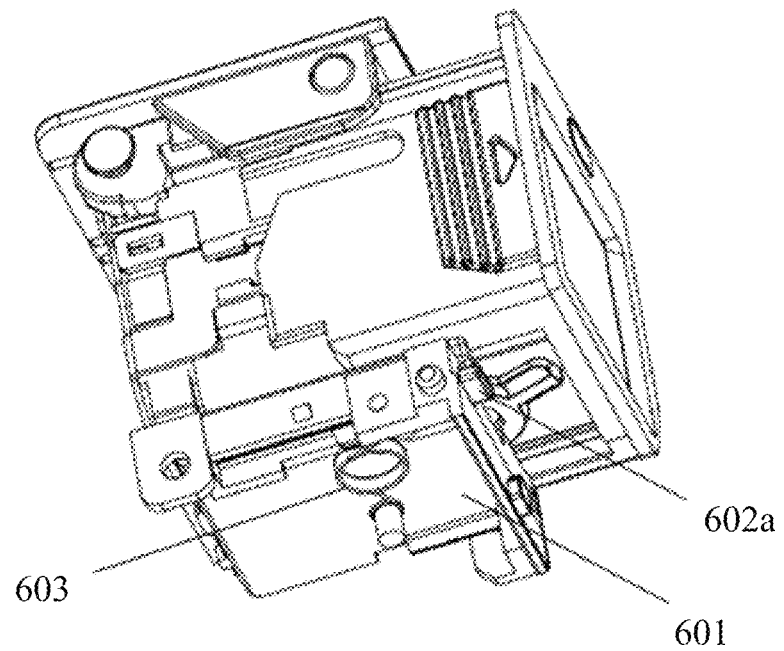

Next, the configuration of the finder unit 21 will be described with reference to FIGS. 4A to 4D. FIGS. 4A to 4D are perspective views illustrating components of the finder unit 21. FIGS. 4A and 4B are perspective views illustrating a state in which the eyepiece 28 of the finder unit 21 is pulled out. On a side surface of the eyepiece 28, the straight groove 606a that fits with the convex portion 605 is provided on a surface facing the convex portion 605 provided so as to be projected on the inner surface of the finder cover 49. Further, an inner cover 607 fixed to the top cover 16 is provided on an inner surface of the top cover 16 (not shown). The inner cover 607 has an insertion opening 607a for the restricting member 602 to penetrate. In a state where the eyepiece 28 is completely pulled out from the finder fixed barrel 45 as illustrated in FIGS. 4A and 4B, a penetrating portion 602a of the restricting member 602 protrudes from the base 601 and penetrates the insertion opening 607a.

Figure 4C:
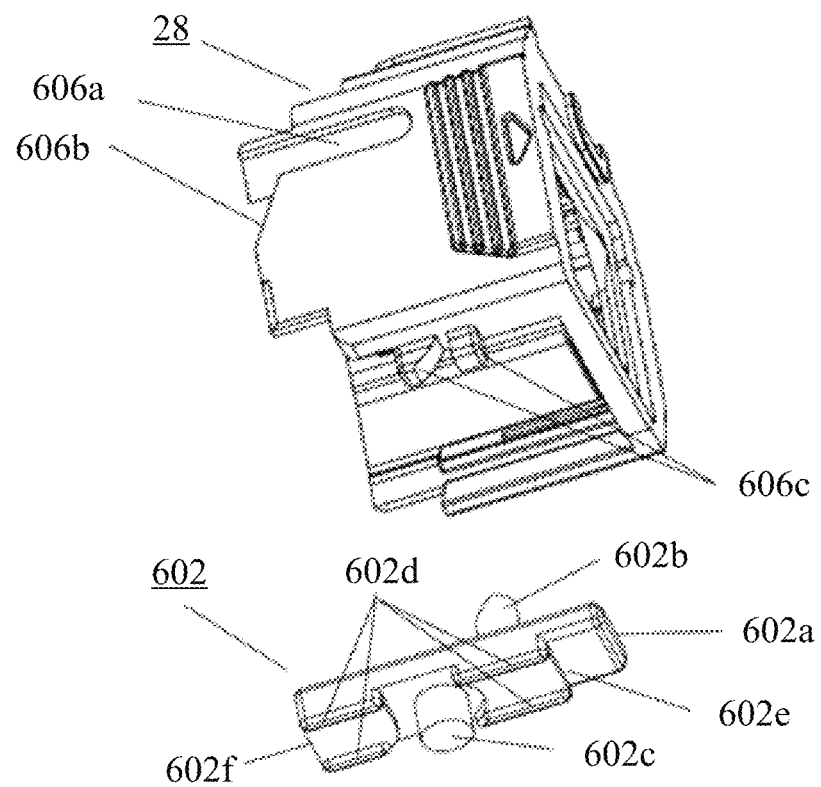

FIG. 4C is a perspective view of the eyepiece 28 and the restricting member 602. The eyepiece 28 has the straight groove 606a and a guiding portion 606b connected to the straight groove 606a. The guiding portion 606b is a cam surface. There is an engaging portion 606c which is bifurcated on a lower surface of the eyepiece 28. The penetrating portion 602a is provided at one end portion of the restricting member 602. Contact portions 602e and 602f are provided on both sides of the restricting member 602 as contact surfaces for restricting a linear movement position of the restricting member 602. On an upper surface of the restricting member 602, there is a convex portion 602b which is an engaged portion having a convex shape that engages with the engaging portion 606c. On a lower surface of the restricting member 602, there is a shaft portion (second shaft portion) 602c for supporting one end portion of the urging member 603. The restricting member 602 has a rail portion 602d on a surface facing the support member 604 in order to reduce a contact area between the restricting member 602 and the support member 604 and improve slidability.

Figure 4D:
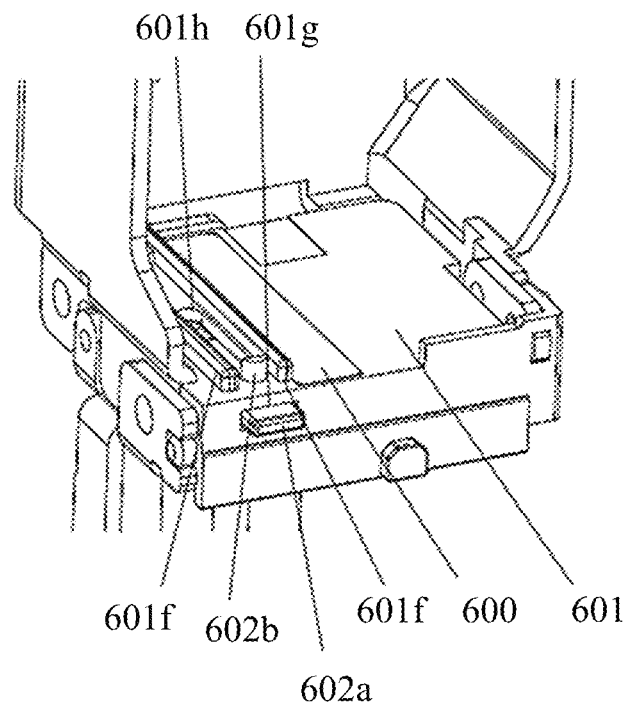

FIG. 4D is a perspective view of a periphery of an upper surface of the base 601. On a side surface of the base 601, there is an opening 601g for the penetrating portion 602a of the restricting member 602 to enter and exit. The decorative plate 600 for concealing an opening (not shown) on the upper surface of the base 601 is adhered to the upper surface of the base 601. Further, there is an elongated hole 601h on the upper surface of the base 601, and the convex portion 602b of the restricting member 602 penetrates the elongated hole 601h. On both sides of the elongated hole 601h, protective portions 601f having a rib shape and the same height as a height of a tip of the protruding convex portion 602b are provided. The protective portions 601f function as a protective member so that the user who handles the image-capturing apparatus 1 does not carelessly touch the convex portion 602b from an outside. The same here means that it does not have to be the same in a strict sense as long as the protective portions 601f function as the protective member. In this embodiment, the tip of the convex portion 602b protrudes from the upper surface of the base 601. However, if the convex portion 602b and the engaging portion 606c can be engaged, the tip of the convex portion 602b may be buried from the upper surface of the base 601.

Figure 5A:
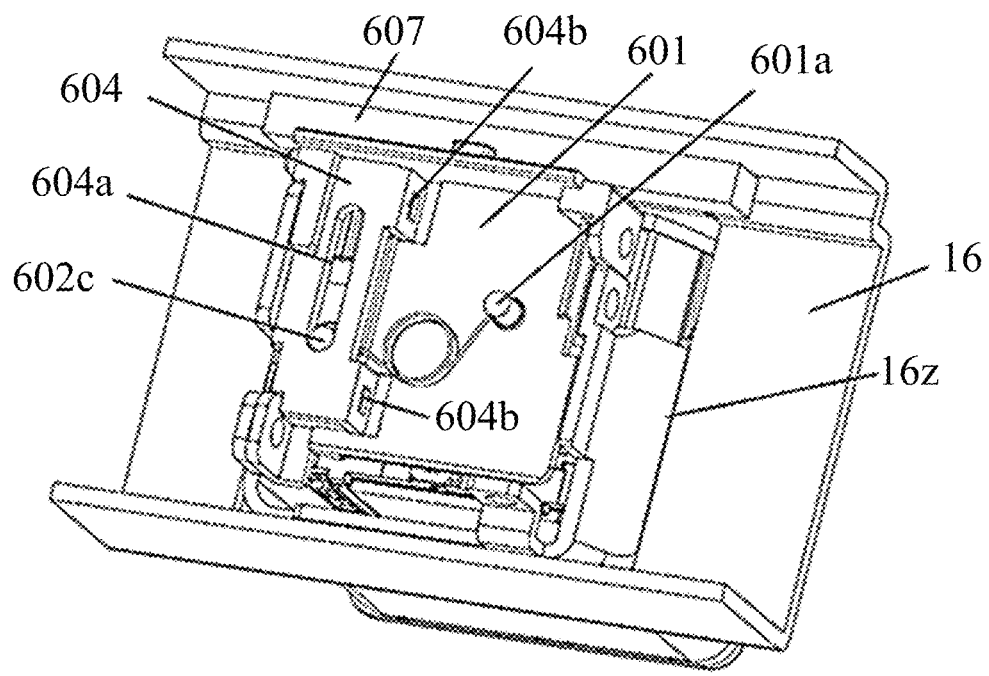
FIGS. 5A to 5C are perspective views of main components of the finder unit as viewed from an inside of the image-capturing apparatus.
Figure 5B:
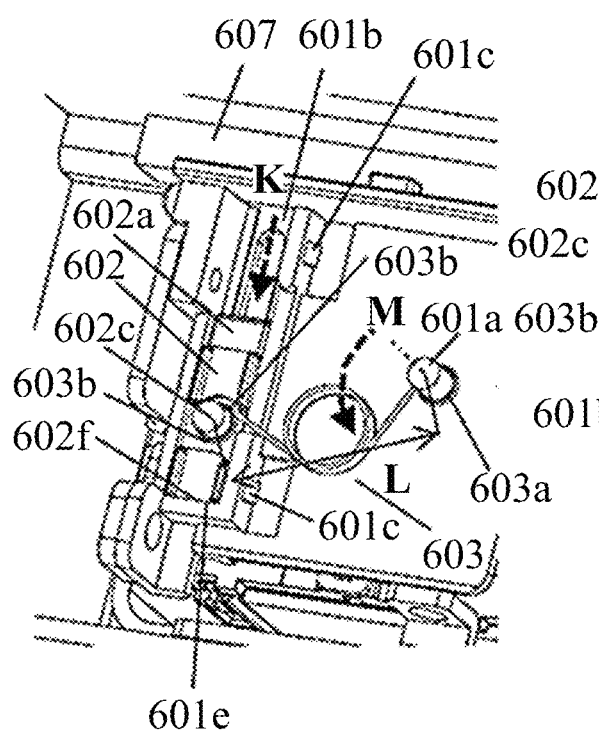
Figure 5C:
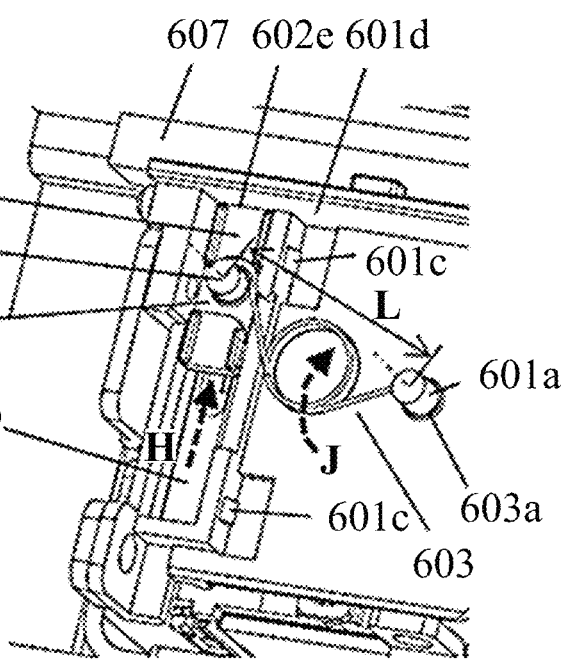

Next, an operation of the restricting member 602 will be described with reference to FIGS. 5A to 5C. FIGS. 5A to 5C are perspective views of main components of the finder unit 21 as viewed from an inside of the image-capturing apparatus 1. FIGS. 5A and 5B are perspective views of a state (projected state) in which the finder unit 21 is projected from the top cover 16 of the image-capturing apparatus 1 and the eyepiece 28 is retracted. FIG. 5C is a perspective view of a state (pulled-out state) in which the finder unit 21 is projected from the top cover 16 of the image-capturing apparatus 1 and the eyepiece 28 is pulled out. In both FIGS. 5B and 5C, the support member 604 is not illustrated so that a movement of the restricting member 602 can be seen.

FIGS. 5A and 5B illustrate the projected state illustrated in FIG. 2A. An end portion 603a, which is one end portion of the toggle spring which is the urging member 603, is engaged with a shaft portion (first shaft portion) 601a provided on the base 601, and an end portion 603b of the toggle spring, which is the other end portion, is engaged with the shaft portion 602c of the restricting member 602. The base 601 has a plurality of claw portions 601c, and the claw portions 601c are locked to a plurality of holes 604b provided in the support member 604. As a result, the support member 604 is fixed to the base 601. The support member 604 has an elongated hole 604a, and the shaft portion 602c of the restricting member 602 penetrates the elongated hole 604a so that the end portion 603b of the toggle spring cannot be pulled out. The base 601 has a groove portion 601b, and the restricting member 602 is inserted into the groove portion 601b and held so as to be linearly movable in a longitudinal direction of the groove portion 601b. The top cover 16 has an opening 16z through which the finder unit 21 enters and exits.

In FIG. 5B, the convex portion 602b (not shown) is engaged with the engaging portion 606c of the eyepiece 28. In a linearly movable range along the longitudinal direction of the groove portion 601b of the restricting member 602 from a state of FIG. 5B to a state of FIG. 5C, a shaft distance L between the shaft portion 601a and the shaft portion 602c is equal and the largest for the state of FIG. 5B and the state of FIG. 5C. The shaft distance L becomes the smallest while the restricting member 602 linearly moves between the state of FIG. 5B and the state of FIG. 5C. For example, it is the smallest in the middle of the state of FIG. 5B and the state of FIG. 5C. The toggle spring, which is the urging member 603, has the smallest urging force for widening the shaft distance L in FIGS. 5B and 5C, and on the contrary, the toggle spring has the largest urging force while the restricting member 602 linearly moves between FIGS. 5B and 5C.

When the eyepiece 28 is in a retracted position, the toggle spring, which is the urging member 603, tries to rotate in a counterclockwise direction (M direction) around the shaft portion 601a in an attempt to release a compressed force. The end portion 603b of the toggle spring always urges the shaft portion 602c of the restricting member 602 in a K direction. Therefore, the contact portion 602f of the restricting member 602 comes into contact with an inner wall 601e of the base 601 while being urged to stop. The penetrating portion 602a is constantly urged by the toggle spring of the urging member 603 so that it is completely removed from the insertion opening 607a. For this reason, even if unintentional vibration or dropping occurs, the penetrating portion 602a is unlikely to penetrate the insertion opening 607a. Therefore, in FIG. 5B in which the eyepiece 28 is retracted, the movement of the base 601 to the projected state or the retracted state with respect to the image-capturing apparatus 1 is not restricted. Further, in the movement of the finder unit 21 to the projected state or the retracted state, the penetrating portion 602a does not protrude into a movement path of the finder unit 21 and hinder the movement.

FIG. 5C is the pulled-out state illustrated in FIG. 2B. FIG. 5C illustrates a state in which the convex portion 602b (not shown) is engaged with the engaging portion 606c of the eyepiece 28, and the restricting member 602 is moved in an H direction by pulling out the eyepiece 28. When the eyepiece 28 is pulled out, the toggle spring, which is the urging member 603, is rotated in a clockwise direction (J direction) around the shaft portion 601a. At the same time, the end portion 603b of the toggle spring urges the shaft portion 602c in the H direction, and the contact portion 602e of the restricting member 602 comes into contact with the inner wall 601d of the base 601 and stops with the shaft portion 602c being urged. The restricting member 602 is urged by the toggle spring of the urging member 603 in a state where the penetrating portion 602a always penetrates the insertion opening 607a. For this reason, even if unintentional vibration or dropping occurs, the penetrating portion 602a does not easily come off from the insertion opening 607a. Therefore, in the state where the eyepiece 28 is pulled out, the movement of the base 601 to the retracted state with respect to the image-capturing apparatus 1 is restricted.

When the user of the image-capturing apparatus 1 pulls out the eyepiece 28 from the state of FIG. 5B to the state of FIG. 5C, the user pulls out the eyepiece 28 against a force with which the eyepiece 28 is retracted in the vicinity of the state of FIG. 5B. In the middle of the operation from the state of FIG. 5B to the state of FIG. 5C, the user of the image-capturing apparatus 1 feels a load of compressing the urging member 603 as the force with which the eyepiece 28 is retracted gradually disappears, and when the maximum load is exceeded, the user feels that the force has switched to a force to push out the eyepiece 28. In the operation immediately before reaching the state of FIG. 5C, the user of the image-capturing apparatus 1 performs the pull-out operation while feeling the force with which the eyepiece 28 tries to move in the pull-out direction by itself.

When the user of the image-capturing apparatus 1 retracts the eyepiece 28 from the state of FIG. 5C to the state of FIG. 5B, the user retracts the eyepiece 28 against a force with which the eyepiece 28 is pushed out in the vicinity of the state of FIG. 5C. In the middle of the operation from the state of FIG. 5C to the state of FIG. 5B, the user of the image-capturing apparatus 1 feels a load of compressing the urging member 603 as the force with which the eyepiece 28 is pushed out gradually disappears, and when the maximum load is exceeded, the user feels that the force has switched to a force to retract the eyepiece 28. In the operation immediately before reaching the state of FIG. 5B, the user of the image-capturing apparatus 1 performs the retraction operation while feeling the force with which the eyepiece 28 tries to move in the retraction direction by itself.

As described above, the user of the image-capturing apparatus 1 can make the operation while feeling a pleasant touch by the urging force of the toggle spring of the urging member 603, the pull-out/retraction operation of the eyepiece 28 between FIGS. 5B and 5C being heavy in the middle of the operation and being light at the operation end.

Figures 6A, 6B:
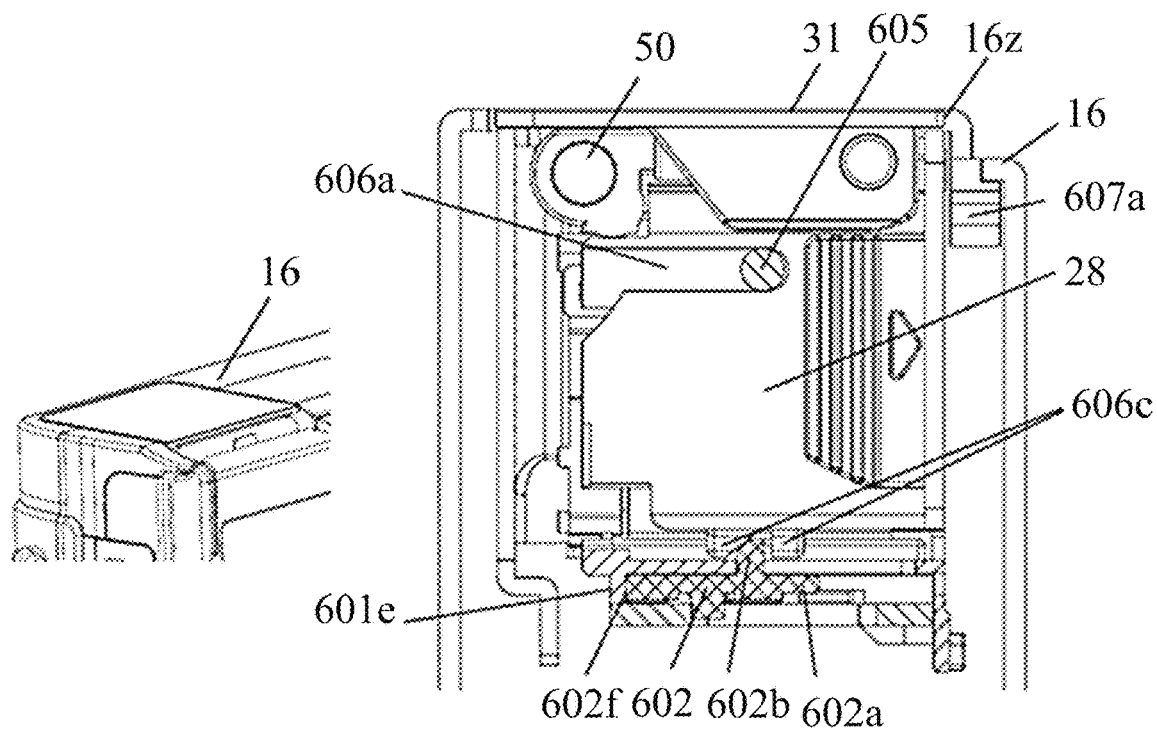
FIGS. 6A and 6B are diagrams illustrating a state in which the finder unit is built in the image-capturing apparatus.
Figures 7A, 7B:
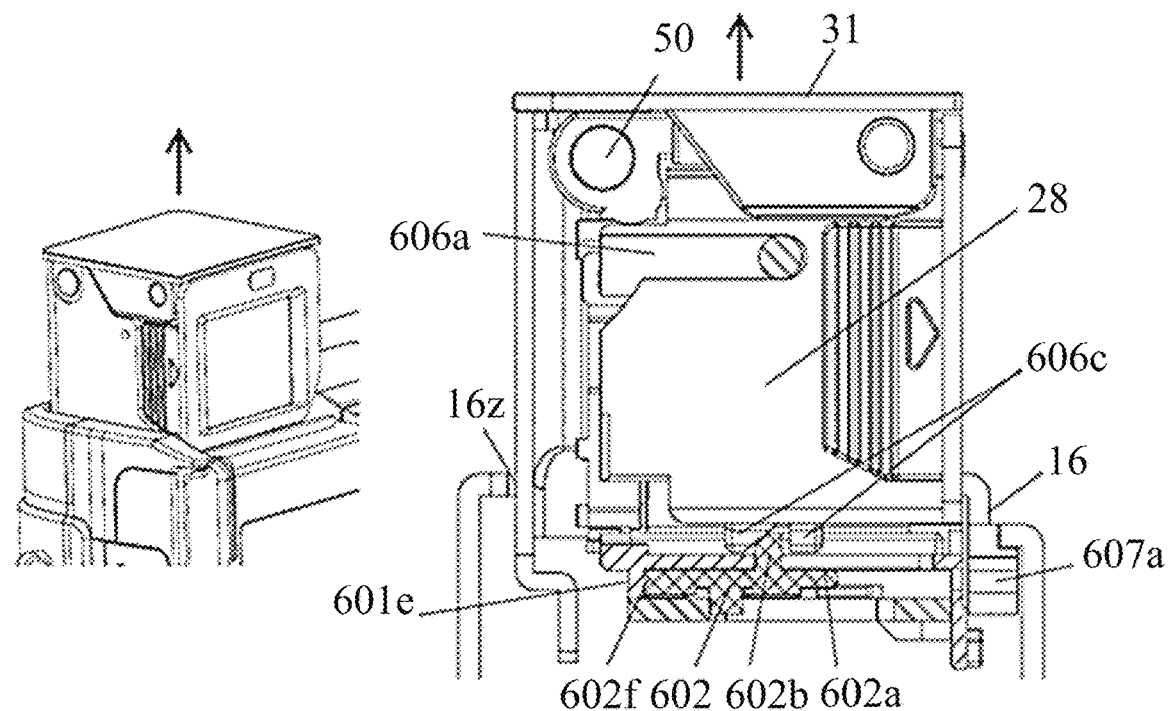
FIGS. 7A and 7B are diagrams illustrating a state in which the finder unit is projected upward of the image-capturing apparatus.
Figures 8A, 8B:
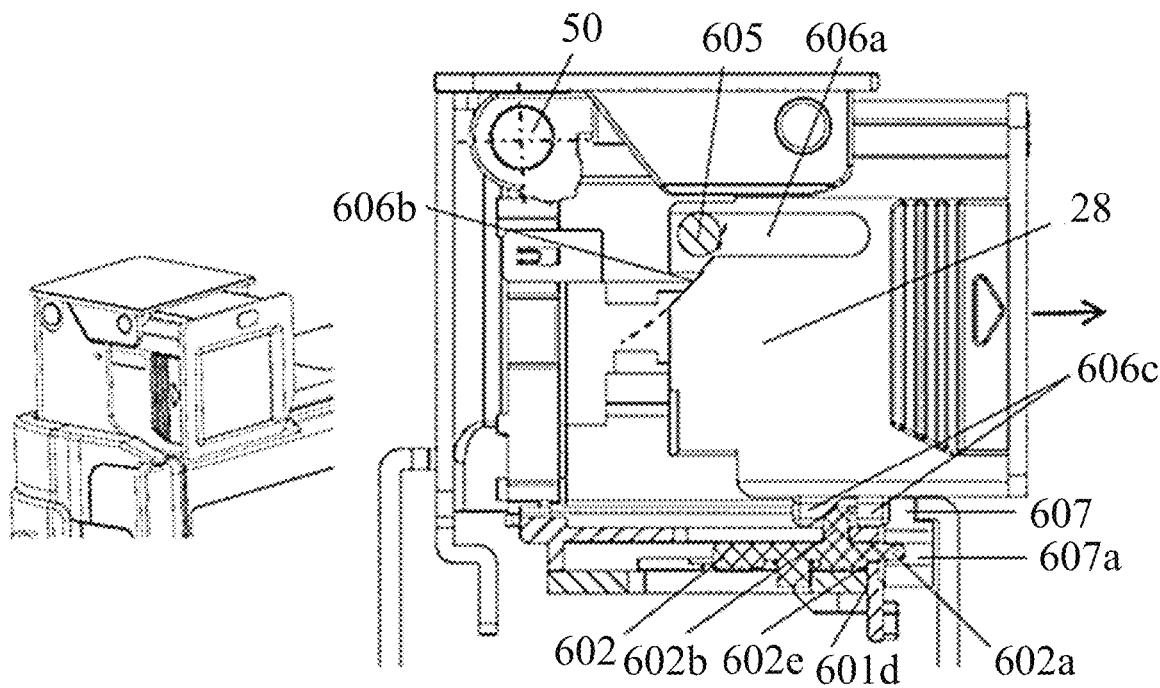
FIGS. 8A and 8B are diagrams illustrating a state in which an eyepiece is pulled out from the finder unit.
Figures 9A, 9B:
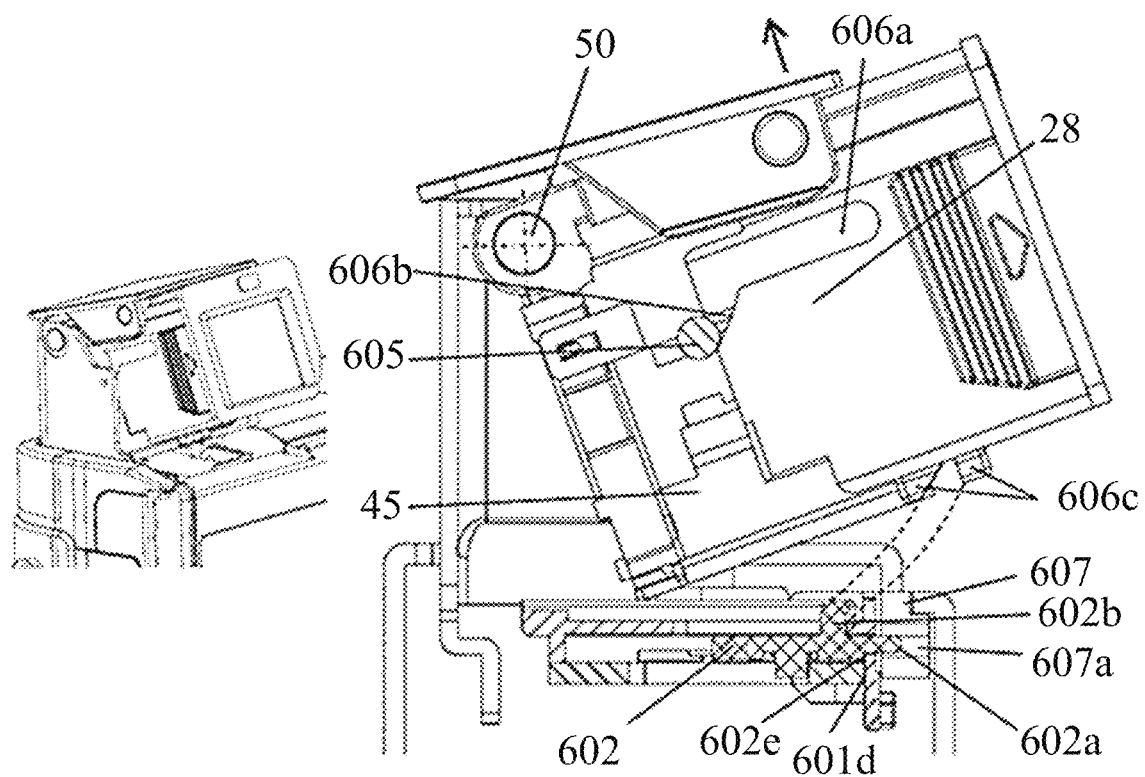
FIGS. 9A and 9B are diagrams illustrating a state in which a finder rotating portion is rotated.

Next, an operation of the finder unit 21 will be described with reference to FIGS. 6A to 9B. FIGS. 6A and 6B are diagrams illustrating a state (retracted state) in which the finder unit 21 is retracted in the image-capturing apparatus 1. FIGS. 7A and 7B are diagrams illustrating a state (projected state) in which the finder unit 21 is projected upward of the image-capturing apparatus 1. FIGS. 8A and 8B are diagrams illustrating a state (pulled-out state) in which the eyepiece 28 is pulled out from the finder unit 21. FIGS. 9A and 9B are diagrams illustrating a state in which the finder rotating portion 41 is rotated. FIGS. 6A, 7A, 8A, and 9A are perspective views viewed from an upper part of the back surface of the image-capturing apparatus 1, and FIGS. 6B, 7B, 8B, and 9B are partial cross-sectional views illustrating an engagement of each part.

As illustrated in FIGS. 6B and 7B, the convex portion 605 on a non-rotatable side is fitted into the straight groove 606a on a side of the finder rotating portion 41. Further, the restricting member 602 has the penetrating portion 602a separated from the insertion opening 607a, and the contact portion 602f is brought into contact with the inner wall 601e of the base 601 while being urged to stop.

By the release operation of the lock lever 36 of the pop-up mechanism portion 51, the finder unit 21 is projected from the state illustrated in FIGS. 6A and 6B to the state illustrated in FIGS. 7A and 7B. By the projection start operation, a force with which the finder rotating portion 41 is rotated from the retracted position of the eyepiece 28 around the finder unit rotation shaft 50 acts on the finder rotating portion 41 due to a stop impact at a projection operation terminal. However, since the convex portion 605 on the non-rotatable side is fitted into the straight groove 606a provided in the eyepiece 28, the rotational force with which the finder rotating portion 41 is rotated around the finder unit rotation shaft 50 is suppressed by the convex portion 605. The shaft distance between the finder unit rotation shaft 50 and the convex portion 605 on the non-rotatable side is separated from the center of the finder unit rotation shaft 50, which is the center of rotation, and thus the stop impact is effectively absorbed at the projection operation terminal.

Next, as illustrated in FIG. 8B, when the eyepiece 28 is pulled out in a direction of the arrow, the restricting member 602 is pulled out in conjunction with the engaging portion 606c and the convex portion 602b being engaged, and the penetrating portion 602a is inserted into the insertion opening 607a of the inner cover 607. At a position where the penetrating portion 602a is completely inserted into the insertion opening 607a, the convex portion 605 is separated from the straight groove 606a. There is a gap between the engaging portion 606c and the convex portion 602b in the operation direction of the arrow. Although when the eyepiece 28 is moved at a pull-out completion position illustrated in FIG. 8B, there is a gap between the engaging portion 606c and the convex portion 602b, the contact portion 602e of the restricting member 602 is brought into contact with the inner wall 601d while being urged by the urging force of the toggle spring of the urging member 603 to stop. A position of the convex portion 602b of the restricting member 602 with respect to the image-capturing apparatus 1 is always urged by the urging member 603 and kept constant.

The convex portion 605 of the finder cover 49 is separated from the straight groove 606a by the pull-out operation of the eyepiece 28 and comes to a region of the guiding portion 606b connected to the straight groove 606a. A cam shape of the guiding portion 606b is a locus of the convex portion 605 when the pulled-out eyepiece portion 28 is rotated around the finder unit rotation shaft 50. That is, the finder rotation unit 41 can be rotated only when the state illustrated in FIGS. 8A and 8B is reached. Until the eyepiece 28 is completely pulled out, the convex portion 605 is engaged with the straight groove 606a, so that the finder rotating portion 41 cannot be rotated around the finder unit rotation shaft 50.

As illustrated in FIG. 9B, when the finder rotating portion 41 is rotated around the finder unit rotation shaft 50 in the arrow direction, the eyepiece 28 is rotated with a cam surface of the guiding portion 606b being along the convex portion 605. During the rotational operation of the eyepiece 28, the guiding portion 606b is restricted by the convex portion 605 at least while the engaging portion 606c is disengaged from the movement locus in which the convex portion 602b is pulled out and retracted with respect to the finder unit 21. That is, the convex portion 605 and the guiding portion 606b can be engaged with each other at least while the engaging portion 606c is disengaged from the movement locus of the convex portion 602b between the projected state and the pulled-out state. During the course of rotating the finder rotating portion 41 from the state illustrated in FIGS. 8A and 8B to the state illustrated in FIGS. 9A and 9B, the engagement of the engaging portion 606c provided on the eyepiece 28 and the convex portion 602b is released.

The eyepiece 28 has a configuration capable of translating in the optical axis direction of the finder lens with respect to the finder fixed barrel 45. However, when the finder rotating portion 41 is rotated from the state of FIGS. 8A and 8B to the state of FIGS. 9A and 9B, since the guiding portion 606b is along the convex portion 605, even if the eyepiece 28 is pushed in a translational retraction direction, the guiding portion 606b is supported by the convex portion 605, so that the eyepiece 28 cannot be moved in the retraction direction. On the contrary, even when the finder rotating portion 41 is rotated around the finder unit rotation shaft 50 from the state of FIGS. 9A and 9B to the state of FIGS. 8A and 8B, the eyepiece 28 cannot be moved in the translation retraction direction as well. Therefore, the engaging portion 606c can be accurately engaged with and disengaged from the convex portion 602b while maintaining the position from the center of the finder unit rotation shaft 50.

Further, the restricting member 602 is always urged by the urging member 603 regardless of the rotation of the finder rotating portion 41 as described with FIGS. 8A and 8B, and a position of the convex portion 602b of the restricting member 602 with respect to the image-capturing apparatus 1 is held at a position where it can be engaged with the engaging portion 606c. Therefore, even if the finder rotating portion 41 is pushed in the retraction direction of the finder unit 21 (in the direction opposite to the arrow in FIGS. 7A and 7B), since the penetrating portion 602a of the restricting member 602 is inserted into the insertion opening 607a, the finder rotating portion 41 does not go down.

A transition to the retracted state is operated, contrary to the above, in the order of FIGS. 9A and 9B, FIGS. 8A and 8B, FIGS. 7A and 7B, and FIGS. 6A and 6B. In an operation from the state of FIGS. 9A and 9B to the state of FIGS. 8A and 8B, the engaging portion 606c is engaged with the convex portion 602b, and the convex portion 605 is separated from the guiding portion 606b and comes to a position where it can be engaged with the straight groove 606a. In an operation from the state of FIGS. 8A and 8B to the state of FIGS. 7A and 7B, the engaging portion 606c pushes the convex portion 602b, the convex portion 605 is fitted into the straight groove 606a, and then the insertion of the penetrating portion 602a and the insertion opening 607a is released. The convex portion 605 of the finder unit 21 is engaged with the straight groove 606a until the engagement of the penetrating portion 602a is released. In the operation from the state of FIGS. 7A and 7B to the state of FIGS. 6A and 6B, the restricting member 602 is held in the retracted position.

In this embodiment, in the operation from the state of FIGS. 9A and 9B to the state of FIGS. 8A and 8B, the cam surface is used as the guiding portion 606b that guides the eyepiece 28 to a predetermined position when the engaging portion 606c is engaged with the convex portion 602b without colliding with the convex portion 602b. A shape of the guiding portion 606b does not matter as long as the engaging portion 606c can be engaged with the convex portion 602b without colliding with the convex portion 602b during the rotational operation of the eyepiece 28.

As described above, the convex portion 605 is fitted into the straight groove 606a while the eyepiece 28 is retracted, so that even if the finder unit 21 is moved from the retracted state to the projected state, the unintentional rotation operation of the finder rotating portion 41 due to an impact of the projection operation is suppressed. Further, while the eyepiece 28 is not pulled out from the finder unit 21, inadvertent rotation of the finder rotating portion 41 by the user who handles the image-capturing apparatus 1 is also prevented.

Further, in the finder unit 21, by providing the guiding portion 606b connected to the straight groove 606a, the engaging portion 606c and the convex portion 602b maintain a rotational position relationship, so that accurate disengagement and engagement can be performed. The present disclosure realizes the above functions with a simple configuration in which the shapes of the existing parts of the straight groove 606a, the guiding portion 606b, and the convex portion 605 are changed.

Further, when the finder unit 21 tries to transition to the retracted state with respect to the image-capturing apparatus 1 with the eyepiece 28 pulled out, the restricting member 602 is inserted into the insertion opening 607a, which prevents the finder unit 21 from transitioning to the retracted state. The present disclosure realizes the above functions with a small number of parts such as the restricting member 602, the urging member 603, the support member 604, and the insertion opening 607a.

As a result, there is no problem that when the image-capturing apparatus 1 is in use, the finder unit 21 is inadvertently lowered toward the retracted state after the rotation operation of the finder unit 21, and the finder display image cannot be visually recognized. Depending on a state of the eyepiece 28, it is possible to prevent the finder 20 from inadvertently transitioning to unintended states, which prevents a decrease in convenience and a damage to the camera.

According to the above embodiment, the image-capturing apparatus including the compact finder that is not projected from the camera body when not in use, is rotatable in a state where it is projected from the camera body when in use, and can prevent a decrease in convenience and a damage to the camera due to inadvertent transition to unintended states can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-231168, filed on Dec. 23, 2019 which is hereby incorporated by reference herein in its entirety.

What is claimed is:

1. An image-capturing apparatus comprising:
   a main body; and
   a finder unit configured to transition between a retracted state in which the finder unit is retracted inside the main body and a projected state in which the finder unit is projected outside the main body,
   wherein the finder unit includes
      a non-rotatable portion provided with a rotation shaft,
      a rotatable portion that is rotatable around the rotation shaft and has an eyepiece, and
      a restricting member that restricts a transition from a pulled-out state in which the eyepiece is pulled out from the finder unit in the projected state to the retracted state,
   wherein the eyepiece has an engaging portion and the restricting member has an engaged portion having a convex shape, the engaging portion and the engaged portion being engaged with each other in a transition between the projected state and the retracted state, and
   wherein an engagement between the engaging portion and the engaged portion is released when the rotatable portion is rotated in the pulled-out state.

2. The image-capturing apparatus according to claim 1, wherein the eyepiece is movable with respect to the finder unit in a direction along an optical axis of a lens held inside the finder unit.

3. The image-capturing apparatus according to claim 1, wherein the non-rotatable portion includes a convex portion,
   wherein the eyepiece includes a straight groove engaged with the convex portion, and
   wherein an engagement between the convex portion and the straight grove is released in the pulled-out state.

4. The image-capturing apparatus according to claim 3, wherein the engagement between the convex portion and the straight groove restricts a rotation of the rotatable portion during a transition between the projected state and the pulled-out state.

5. The image-capturing apparatus according to claim 3, wherein the eyepiece includes a guiding portion connected to the straight groove, and
wherein the convex portion is engaged with the guiding portion while the rotatable portion is rotated in the pulled-out state.

6. The image-capturing apparatus according to claim 5, wherein an engagement between the convex portion and the guiding portion restricts a retraction of the eyepiece into the rotatable portion while the rotatable portion is rotated in the pulled-out state.

7. The image-capturing apparatus according to claim 5, wherein the convex portion and the guiding portion can be engaged with each other at least while the engaging portion is disengaged from a movement locus of the engaged portion between the projected state and the pulled-out state.

8. The image-capturing apparatus according to claim 1, wherein the finder unit further includes a base provided in a lower part of the finder unit and on an upper surface of the restricting member, and
wherein the base is provided with a protective portion having the same height as a tip portion of the engaged portion near the engaged portion.

9. The image-capturing apparatus according to claim 8, wherein the base has an elongated hole, and the engaged portion penetrates the elongated hole, and
wherein the protective portion is provided on both sides of the elongated hole.

10. The image-capturing apparatus according to claim 9, wherein the protective portion has a rib shape.

11. The image-capturing apparatus according to claim 8, wherein the finder unit further includes an urging member that urges the restricting member, the urging member being provided between the base and the restricting member.

12. The image-capturing apparatus according to claim 11, wherein the urging member is a toggle spring.

13. The image-capturing apparatus according to claim 12, wherein one end portion of the toggle spring is engaged with a first shaft portion provided on the base, and the other end portion of the toggle spring is engaged with a second shaft portion provided on the restricting member, and
wherein a shaft distance between the first shaft portion and the second shaft portion becomes the largest in the projected state in which the eyepiece is not pulled out and in the pulled-out state in which the eyepiece is completely pulled out, and becomes the smallest in the middle of a linear movement of the restricting member between the projected state and the pulled-out state.

14. The image-capturing apparatus according to claim 1, wherein an inner cover having an insertion opening for the restricting member to penetrate is provided inside the main body, and
wherein a penetrating portion of the restricting member penetrates the insertion opening in the pulled-out state.

\* \* \* \* \*